(No Model.)
B. L. CAMPBELL.
CUTTING BLADE.
No. 556,615. Patented Mar. 17, 1896.
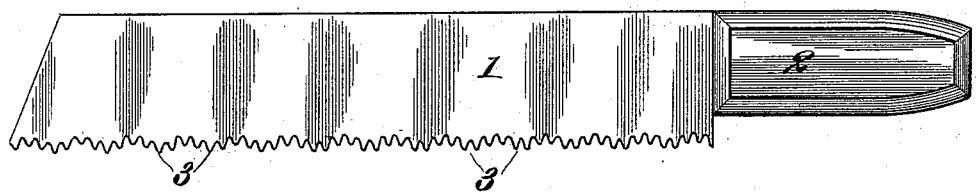
Fig. I.
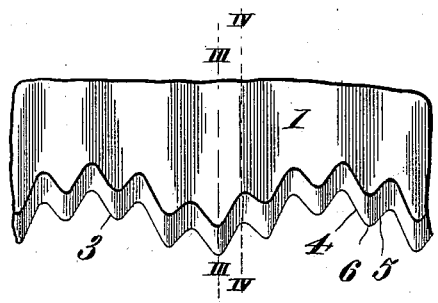
Fig. II.
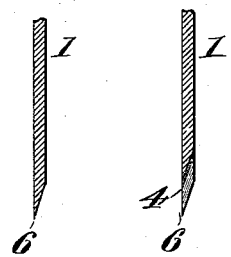
Fig. III. Fig. IV.
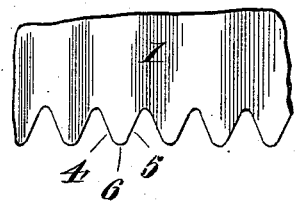
Fig. V.
Attest:
Charles Pickles,
Stanley Stoner
Inventor:
Benj' L. Campbell
By Wright Bro
att'ys

UNITED STATES PATENT OFFICE.

BENJAMIN L. CAMPBELL, OF ST. LOUIS, MISSOURI, ASSIGNOR OF ONE-HALF TO LOUIS R. HOLLOWAY, OF SAME PLACE.

CUTTING-BLADE.

SPECIFICATION forming part of Letters Patent No. 556,615, dated March 17, 1896.

Application filed April 8, 1895. Serial No. 544,918. (No model.)

*To all whom it may concern:*

Be it known that I, BENJAMIN L. CAMPBELL, of the city of St. Louis, in the State of Missouri, have invented a certain new and useful Improvement in Cutting-Blades, of which the following is a full, clear, and exact description, reference being had to the accompanying drawings, forming part of this specification.

My invention relates to an improved cutting-blade, and is especially designed for bread and cake knives, though it may be used for other purposes.

My invention consists in features of novelty hereinafter fully described and pointed out in the claims.

Figure I is a side view of my improved blade. Fig. II is an enlarged detail view showing the other side of the blade to that shown in Fig. I. Fig. III is a transverse section taken on line III III, Fig. II. Fig. IV is a transverse section taken on line IV IV, Fig. II. Fig. V is a detail view showing a modification.

Referring to the drawings, 1 represents a blade which may be provided with a handle 2.

3 represents the teeth of the blade, formed integral therewith and being beveled on one side of the blade only, as shown in Figs. I and IV. Each tooth has an approximately acute point and forms two straight cutting-edges 4 and 5 and a sharp cutting-point 6, thereby making a very effective cutting-edge to the blade.

I prefer to make the cutting-edge of the blade wavy or serpentine in form, thus providing each tooth with a series of stepped teeth or serrations, as shown in Figs. I and II, as the cutting-edges of the teeth are thereby more effective in their operation; but my invention may be carried out to a certain extent by forming the teeth on a straight line, as shown in Fig. V.

I claim as my invention—

1. A cutting-blade having a series of integral acute-angle teeth formed with a straight back, with a beveled front, with approximately acute cutting-points 6 at their outer extremities, with the spaces between the teeth having approximately acute curves at their inner extremities, and with the straight cutting-edges 4 and 5; substantially as described.

2. A cutting-blade having a serpentine cutting-edge each wave or curve of the cutting-edge having a number or series of cutting-teeth arranged in steps formed with a straight back, with a beveled front, with approximately acute cutting-points 6 at their outer extremities, with the spaces between the teeth having approximately acute curves at their inner extremities, and with the straight cutting-edges 4 and 5; substantially as described.

BENJAMIN L. CAMPBELL.

In presence of—
W. FINLEY,
STANLEY STONER.